Nov. 6, 1945.  C. S. FULLER  2,388,319
CROSS-LINKED POLYESTERS AND ELECTRICAL
CONDUCTORS CONTAINING THEM
Filed July 11, 1941

INVENTOR
C. S. FULLER
BY
B. H. Jackson
ATTORNEY

Patented Nov. 6, 1945

2,388,319

UNITED STATES PATENT OFFICE 2,388,319

CROSS-LINKED POLYESTERS AND ELECTRICAL CONDUCTORS CONTAINING THEM

Calvin S. Fuller, Chatham, N. J., assignor to Bell Telephone Laboratories, Incorporated, New York, N. Y., a corporation of New York Application July 11, 1941, Serial No. 401,952

14 Claims. (Cl. 174—121)

The present invention relates to new compositions of matter having many uses, among them the impregnation of porous materials to form tough, abrasion-resistant bodies. It also relates to electrical conductors having fibrous coverings impregnated with these new compositions of matter.

Linear polyesters of high molecular weight, such as those described in United States Patent 2,071,250 to W. H. Carothers, have excellent properties of toughness and flexibility which fit them for many uses. Porous or fibrous materials such as textile fabrics, when thoroughly impregnated with these polyesters possess a remarkable strength, toughness and abrasion-resistance. These desirable properties of the linear polyesters are associated with high molecular weights and particularly with molecular weights sufficiently high to impart to the polyester the property of cold drawing. The property of cold drawing appears in microcrystalline linear polyesters when average molecular weights are in the vicinity of 8,000 to 10,000 or above, as determined by the Staudinger viscosity method.

The novel compositions of the present invention are produced by heating polyesters which initially possess molecular weights above the cold drawing point under suitable conditions to produce cross-linking, as by heating them in intimate contact with an organic peroxide, for a time sufficient to cause the desired degree of cross-linking. The present invention is concerned primarily with substances produced by the vulcanization of microcrystalline polyesters which have a definite proportion of their carbon-to-carbon bonds unsaturated. Similar cross-linking through the use of organic peroxides can be achieved, although much less readily, in the case of fully saturated linear polyesters. The polymers produced by this vulcanization have novel and unique properties. In the cold, below their crystalline "melting points," these compounds are extremely hard and tough. At temperatures above their crystalline melting points, the hardness and toughness imparted by their crystallinity becomes lost and they become rubber-like in their properties. They possess an even greater toughness than the cold drawing linear polyesters and are more resistant to hydrolysis.

It is important from the standpoint of imparting desirable mechanical properties to the products of the present invention that these products be microcrystalline, since the hardness and toughness of the product is directly related to the degree of crystallization. If the polyesters subjected to vulcanization, as described above, are microcrystalline in nature prior to cross-linking, the crystallinity is retained in the final product. The cross-linking of polyesters which do not crystallize at ordinary temperatures produces brittle gels, rubbery gels or sticky gels depending upon the degree of cross-linking and the degree of linear polymerization prior to cross-linking. Highly crystallized cross-linked polyesters of sufficiently high chain length, on the other hand, are extremely hard and tough. They possess a definite crystalline "melting point" above which the crystalline structure disappears and the substances assume physical properties similar to the uncrystallized substances. Substances of intermediate degrees of crystallization possess physical properties intermediate the highly crystallized and the uncrystallized polymers.

The ability of linear polyesters to crystallize depends largely upon the character of the molecular structure of the portion of the polyester molecule between the ester groups. The most readily obtainable of the polyesters which are capable of crystallizing above room temperatures are the fully saturated polyesters prepared by the esterification of saturated straight chain dicarboxylic acids of the general structure

with saturated straight chain dihydric alcohols of the general structure

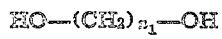

where $n$ and $m$ are integers.

Among the polyesters which tend to remain amorphous in the solid state are those which are prepared by the esterification of a saturated straight chain dihydric alcohol with a dicarboxylic acid containing a relatively large proportion of olefinic carbon-to-carbon bonds, particularly an acid containing conjugated double bonds or a double bond in the alpha position. Those polyesters prepared from a saturated straight chain glycol and maleic acid, fumaric acid, itaconic acid, citraconic acid or muconic acid as the sole dicarboxylic acid tend to remain amorphous. Each of these acids contains olefinic double bonds conjugated with either another olefinic bond or a carbon-to-oxygen double bond of a carboxyl group.

Polyesters which contain conjugated olefinic carbon-to-carbon bonds and which are nevertheless crystalline to a high degree (and are therefore useful for the purposes of the present invention) may be produced by combining the features of the saturated crystalline polyesters and the unsaturated amorphous polyesters described above. Unsaturated microcrystalline polyesters may be produced by substituting a dicarboxylic acid containing a conjugated olefinic bond, such as maleic acid, for a portion of the dicarboxylic acid in a mixture of glycol and dicarboxylic acid which, when esterified, would have produced a microcrystalline polyester. The resulting partially saturated copolyester will be amorphous or crystalline depending upon the relative proportion of saturated and unsaturated ingredients. This relationship of crystallization to degree of unsaturation may be better explained by reference to the drawing in which:

Figure 1:
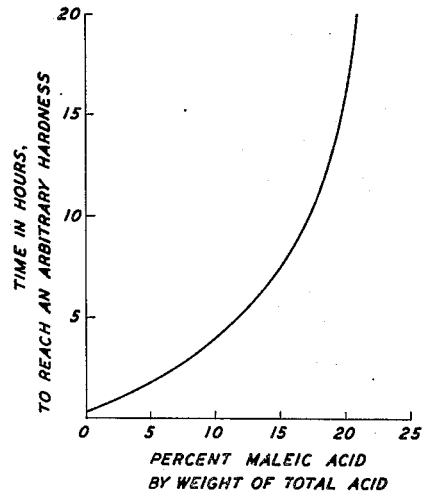
Fig. 1 is a curve representing the time required for polyesters of varying degrees of unsaturation to reach an arbitrary hardness when allowed to cool from the molten state at the melting point.

For the purpose of plotting the curve shown in Fig. 1 a slight excess of ethylene glycol was reacted with a dicarboxylic acid mixture made up of varying proportions of succinic acid and maleic acid. The glycol and dicarboxylic acids were reacted by being heated at 200° C. while dry, oxygen-free hydrogen was bubbled continuously through the reaction mixture. The reaction was allowed to proceed until samples withdrawn from the reaction mixture indicated that the polyester had reached a predetermined value of melt viscosity, just short of gelation. Each polyester was then allowed to cool from the molten state under identical conditions and the time was measured which was required for the polyester to pass from the molten state at the melting point to a point at which it possessed an arbitrary hardness as determined by standard mechanical tests. The length of time required to reach an arbitrary hardness is roughly indicative of the time required for the polyester to reach a state in which it possesses a certain degree of crystallization. The arbitrary hardness selected is roughly indicative of a certain degree of crystallinity in each polyester. The curve of Fig. 1, therefore, represents the rate at which each polyester containing a certain degree of unsaturation crystallizes from the amorphous state when cooled below its melting point.

It can be seen from Fig. 1 that the fully saturated polyesters crystallize most rapidly, whereas polyesters containing more than 25 per cent to 30 per cent maleic acid crystallize extremely slowly.

The curve shown in Fig. 2 was obtained by preparing polyesters from ethylene glycol, succinic acid and maleic acid in the same manner as described in connection with Fig. 1, by allowing the polyester-forming reaction to proceed until the melt viscosity of the polyester had reached a predetermined value and then permitting the polyester to cool and crystallize to a stable condition. The hardness of the polyesters containing varying percentages of maleic acid was then measured after 48 hours by standard mechanical tests. The hardness in each case indicates roughly the total amount of crystallization which the polyester is capable of undergoing at room temperature after 48 hours.

Figure 2:
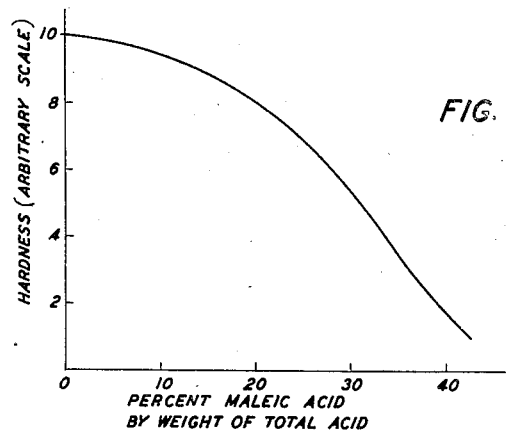
Fig. 2 is a curve representing the relative hardness of polyesters of varying degrees of unsaturation which have been subjected to the same degree of polymerization.

It can be seen from Fig. 2 that the hardness decreases rapidly with the addition of substantial amounts of maleic acid. It can also be seen that the degree of ultimate crystallization is correlated roughly with the speed of crystallization indicated in Fig. 1. It has been found that when the polyesters containing ethylene glycol, succinic acid and maleic acid are reacted to a point just short of gelation of the mixture, no crystals can be found, after several days standing, in products prepared from reaction mixtures containing amounts of maleic acid as little as 50 per cent by weight of the total dicarboxylic acid. As less maleic acid is used the products become more crystalline but really hard and tough products appear only after the maleic acid is reduced to about 10 per cent. The toughest products are produced when the maleic acid constitutes between about 1 per cent and about 5 per cent of the total dicarboxylic acid.

Partially unsaturated microcrystalline polyesters of the type described above, which are capable of being converted into the products of the present invention, and particularly those possessing the property of cold drawing are claimed and more particularly described in the copending application of C. J. Frosch, Serial No. 401,957, filed July 11, 1941.

The products of the present invention are produced by the peroxide induced cross-linking of this type of partially unsaturated polyester lying within the crystallization range. If the molecular weight is sufficiently high in the initial partially unsaturated polyester to cause cold drawing, the resulting cross-linked polymer will also possess the property of cold drawing even though it is gelled to a relatively infusible state. In order to eliminate the prolonged procedure involved in the production of polyesters having linear characteristics and having extremely high molecular weights, it may be desirable that the polyesters used for the cross-linking procedure of the present invention have a molecular weight considerably below that which is necessary to impart the property of cold drawing. Even if the molecular weight of the initial polyester is considerably below the cold drawing point, the cross-linking procedure of the present invention may so increase the effective length of the linear chains in the polyester molecules that the final product possesses the property of cold drawing with the resultant advantages of greater toughness and flexibility. Even if the resulting cross-linked polymers do not contain linear chains of sufficient length to impart the property of cold drawing, still the cross-linking bonds impart to the resulting product a high degree of toughness and strength.

The partially unsaturated polyesters from which the cross-linked polymers of the present invention are produced have been described in terms of polymers formed by the reaction of ethylene glycol, succinic acid and maleic acid. Analogous results may be obtained using varying proportions of other dicarboxylic acids containing unsaturated bonds together with other types of polyester-forming ingredients.

When unsaturated compounds other than maleic acid are used to form the partially unsaturated polyesters, the amount of unsaturation must be limited in the same manner as described above. The effective concentration of unsaturation in any polyester for the purposes of the present invention is best measured as the number of olefinic bonds in the average polyester molecule (assuming all of the unsaturated bonds in the initial reactants to remain as unsaturated bonds in the polyester which is produced) divided by the number of atoms in the linear chain of the average polyester molecule.

For the purposes of the present invention, a conjugated olefinic bond is defined as a carbon-to-carbon double bond which is conjugated with either another carbon-to-carbon double bond or the oxygen-to-carbon double bond of a carboxyl group or an ester linkage. Both types of conjugation are known to produce a considerably greater activity than is possessed by an unconjugated olefinic bond. Hard and tough microcrystalline polyesters suitable for producing the cross-linked polymers of the present invention are obtained when the number of conjugated olefinic bonds is less than about 5 per 400 atoms in the linear chain. This corresponds to the unsaturation in a polyester produced by esterifying ethylene glycol with a dicarboxylic acid mixture made up of 90 mol per cent succinic acid and 10 mol per cent maleic acid. The toughest products are produced when the number of conjugated olefin bonds lies between about .5 and about 2 such bonds per 400 atoms in the linear chain. The unsaturation within this range corresponds to that present in polyesters from ethylene glycol, succinic acid and maleic acid, where the maleic acid is present in an amount between about 1 per cent and about 5 per cent of the total acid.

The partially unsaturated polyesters to be cross-linked by the method of the present invention may be prepared by any suitable procedure as illustrated by the preparation of polyethylene succinate maleate described above. They may be prepared by reacting any glycol capable of forming a crystalline polyester with slightly less than an equimolar proportion of a mixture of a dicarboxylic acid which is capable of forming a microcrystalline polyester with the glycol employed and a dicarboxylic acid containing conjugated olefinic carbon-to-carbon bonds, the proportions of the acids being such that the final product will be microcrystalline as discussed above.

Among the suitable glycols (when combined with the proper dicarboxylic acids) may be mentioned ethylene glycol, hexamethylene glycol, decamethylene glycol or other straight chain aliphatic glycols of the general formula $HO(CH_2)_nOH$ where $n$ is an integer. Among the suitable acids (when combined with the proper glycols) may be mentioned succinic acid, adipic acid, pimelic acid, suberic acid, azelaic acid, sebacic acid, decamethylene dicarboxylic acid, duodecamethylene dicarboxylic acid, octadecandioic acid or other straight chain aliphatic dicarboxylic acids of the general formula

$$COOH(CH_2)_mCOOH$$

where $m$ is an integer. Suitable olefinic acids are maleic acid, fumaric acid, itaconic acid and citraconic acid.

The reaction mixture may be esterified by heating out of contact with oxygen under conditions tending to remove the water vapor generated by the reaction, as by bubbling an inert gas through the reaction mixture, with or without the application of a vacuum, or by beating the reaction mixture into a foam under a vacuum. Preferably the esterification reaction is continued until a polyester is produced having a molecular weight in excess of about 2,000 as determined by the Staudinger viscosity method. During the esterification reaction in which the glycol is reacted with the dicarboxylic acids there proceeds simultaneously a moderate heat-induced cross-linking reaction between the double bonded carbon atoms of the molecules. However, in the absence of oxygen this moderate cross-linking does not proceed at a rate sufficient to cause gelation of the polyester before extremely long linear chains can be produced having molecular weights above those necessary to impart the property of cold drawing.

The initial partially unsaturated microcrystalline polyester produced as described above may be thoroughly admixed with an organic peroxide and heated to produce the novel cross-linked polymer of the present invention. Among the suitable compounds capable of inducing cross-linking may be mentioned benzoyl peroxide, acetone peroxide, methyl Cellosolve peroxide, dioxane perovide, ethylether peroxide, fluorenone peroxide, and the drying oil peroxides. The most suitable compound appears to be benzoyl peroxide.

The compound inducing cross-linking may be mixed with the partially unsaturated polyester in any suitable manner, as by adding the compound as such or in solution to the polyester in the molten or the supercooled stated, by mixing the polyester in finely divided solid form with the compound, or by dissolving the compound and the polyester in a common solvent and subsequently evaporating the solvent.

The amount of organic peroxide employed is not extremely critical. About .1 per cent by weight of benzoyl peroxide or other suitable compound will usually be found sufficient to induce gelation of the partially unsaturated polyesters. Smaller controlled amounts may be added if it is not desired that the cross-linking proceed to the gel state. Larger amounts up to 1 per cent or even 2 per cent by weight of the polyester may be employed so long as the oxidizing action of the compound does not exert a deleterious effect upon the polyester. The mixture of polyester and peroxide may be heated to any temperature sufficiently high to cause the cross-linking action to proceed. Temperatures above 100° C., preferably in the vicinity of 150° C. or higher, will usually be found satisfactory.

The fact that the partially unsaturated polyesters may be subjected to the prolonged heating operation required to produce molecular weights associated with cold drawing and still retain sufficient unsaturation to permit curing appears to be due to a difference in the mechanism of heat polymerization and cross-linking by peroxide. Apparently heat polymerization takes place between conjugated double bonds in adjacent molecules. Therefore, when the unsaturated bonds are sufficiently diluted with saturated bonds so that the probability of an unsaturated bond of one molecule coming into contact with an unsaturated bond of another molecule becomes very slight, the heat polymerization reaction can take place only extremely slowly. However, the peroxide conversion apparently takes place by the dehydrogenation of saturated carbon atoms and subsequent bonding of these atoms to unsaturated carbon atoms of an adjacent molecule or by bonding between adjacent dehydrogenated saturated carbon atoms, as in fully saturated polyesters. Therefore, the dilution of unsaturated bonds does not prevent rapid cross-linking.

The following specific examples will illustrate the manner in which the novel products of the present invention may be prepared.

Example 1

976.5 grams of ethylene glycol, 87.0 grams of maleic acid and 1681.5 grams of succinic acid (molecular ratio 1.05:0.05:0.95) were weighed into a balloon flask which was surrounded by an electrically heated furnace maintained at 200° C. The reactants were heated at this temperature for 9 hours with a stream of dry hydrogen gas constantly bubbling through the mixture. After a large portion of the water of reaction together with a portion of the free glycol had been removed from the reaction mixture by this procedure, the substances remaining in the reaction mixture were of a sufficiently high molecular weight so that continued heating under a vacuum could be carried out without excessive volatilization. The flask and its contents were then subjected to continuous evacuation while allowing sufficient hydrogen to enter the system through a needle valve so as to agitate the reactants and still maintain an absolute pressure of 0.5 centimeters of mercury. At the end of 3 hours, atmosphere pressure was reestablished by the admission of hydrogen and 3 grams of hydroquinone was added to retard subsequent oxidation of the reaction mixture upon exposure to the air. The molten reaction mixture was then poured into trays to cool. The product was a white, brittle, microcrystalline material having a melt viscosity of 162.5 poises at 120° C. A portion of this product was melted and then allowed to supercool to 90° C. at which temperature 1 per cent of finely divided benzoyl peroxide was incorporated by thorough mixing. The resulting mixture was heated for 5 minutes at 150° C. to cause curing or cross-linking. A transparent gel resulted which on cooling quickly crystallized to a hard, flexible, opaque product.

Example 2

976.5 grams of ethylene glycol, 87.0 grams of maleic acid and 2082.0 grams of adipic acid (molecular ratio 1.05:0.05:0.95) were reacted in the same manner as the reaction mixture in Example 1 except that the heating under a vacuum was continued for 6 hours in place of 3 hours. The product of this reaction, prior to cross-linking, was a semihard, brittle, microcrystalline product which melted sharply at approximately 45° C. and which had a melt viscosity of about 180 poises at 100° C. This product when cross-linked in the manner described in Example 1 resulted in a semihard, flexible, tough, microcrystalline product.

Example 3

A reaction mixture similar to that employed in Example 1 except that 87.0 grams of fumaric acid were substituted for the maleic acid was subjected to the reaction conditions described in Example 1. The product of this reaction was similar in its physical properties to the product of Example 1 both before and after cross-linking with benzoyl peroxide.

Example 4

976.5 grams of ethylene glycol, 87.0 grams of maleic acid, 1504.5 grams of succinic acid and 282.0 grams of azelaic acid (molecular ratio 1.05:0.05:0.85:0.10) were reacted in the same manner as the reaction mixture of Example 1 prior to cross-linking. The product of this reaction had a melt viscosity of 190 poises at 120° C. A portion of this product was melted and allowed to supercool to 90° C., at which temperature 1 per cent by weight of finely divided lauryl peroxide was incorporated by thorough mixing. This mixture upon heating for 5 minutes at 150° C. was converted into a transparent gel which upon cooling quickly crystallized to a semihard, flexible, tough, microcrystalline product.

Example 5

976.5 grams of ethylene glycol, 87.0 grams of maleic acid, 1504.5 grams of succinic acid and 282.0 grams of adipic acid were reacted and cross-linked in the same manner as the reaction mixture in Example 4. The resulting product before and after cross-linking possessed physical properties similar to those of the product of Example 4.

Example 6

976.5 grams of ethylene glycol, 87.0 grams of maleic acid, 1504.5 grams of succinic acid and 292.5 grams of phenyl succinic acid were reacted in the same manner as described in Example 4 except that benzoyl peroxide was substituted for the lauryl peroxide in the cross-linking procedure.

The product was similar in its properties to the product of Example 4.

Example 7

A reaction mixture similar to that described in Example 1 except that 2880.0 grams of sebacic acid were substituted for the 1681.5 grams of succinic acid was subjected to the reaction conditions described in Example 1. The product prior to cross-linking was a relatively fusible, brittle, microcrystalline substance which was converted into a tough, flexible product by curing with benzoyl peroxide.

Example 8

A reaction similar to that described in Example 1 was carried out except that the heating under a vacuum was continued for 8 hours instead of 3 hours. The product prior to cross-linking was a white, tough, flexible microcrystalline material possessing the property of cold drawing and having a melt viscosity of 14,600 poises at 120° C. A portion of this material was melted and allowed to supercool to 90° C. at which temperature 1 per cent benzoyl peroxide was incorporated by thorough mixing. After this mixture was heated for 5 minutes at 150° C. a gel was produced which upon cooling was converted to a hard, tough, flexible, microcrystalline product having superior physical properties as compared to the ungelled material.

Example 9

A reaction similar to that described in Example 8 was carried out except that 2880.0 grams of sebacic acid was substituted for the 1681.5 grams of succinic acid. The cross-linked product was similar to that described in Example 8 except that it was less hard.

In the examples given above the unsaturated microcrystalline polymers were prepared by the reaction of a saturated glycol with a saturated dicarboxylic acid and an unsaturated dicarboxylic acid. Obviously, it would be possible to introduce the unsaturation requisite for effective cross-linking by reacting a saturated dicarboxylic acid with a mixture of a saturated glycol and a glycol containing olefinic bonds, the proportions and nature of the ingredients being such that a microcrystalline polyester is produced. Similar results could also be obtained by reacting a saturated glycol with a dicarboxylic acid containing both saturated carbon-to-carbon bonds and olefinic carbon-to-carbon bonds, the relative proportion of saturated and unsaturated bonds being such as to cause the resultant polyester to be microcrystalline. Similar results could be obtained by the reaction of a saturated dicarboxylic acid with a partially unsaturated glycol.

The products described above may obviously be modified in any desired manner as by the addition of pigments, dyes, fillers, plasticizers or other materials which do not detract from the desirable properties of the polymers. The polymers in the course of their preparation may also be copolymerized with other resin producing substances which may modify the properties of but do not destroy the essential characteristics of the polymers of the present invention. Thus any of the polyesters described above may, prior to cross-linking, be mixed with a vinyl compound and the resultant mixture may then have incorporated in it an organic peroxide such as benzoyl peroxide; the mixture may then be heated so as to cause cross-linking and copolymerization of the vinyl compound with the partially unsaturated polyester. The amount of vinyl compound employed should be sufficiently small so that the microcrystalline properties of the polyester are not destroyed. Suitable vinyl compounds which may be thus employed are styrene, methyl methacrylate, vinyl chloride, vinyl acetate, ethyl acrylate, diphenyl benzene or similar vinyl compounds. Copolymers of this type are claimed and more fully described in the copending application of C. S. Fuller, Serial No. 401,953, filed July 11, 1941.

Fully saturated polyesters, such as those produced by the esterification of saturated straight chain glycols with saturated straight chain dicarboxylic acids may be cross-linked in the same manner as described above for the partially unsaturated polyesters. Thus polyesters such as those described in U. S. Patent No. 2,071,250 may be intimately mixed in any suitable manner with an organic peroxide, such as benzoyl peroxide, and heated at about 150° C. until the cross-linking occurs. When fully saturated polyesters are employed, concentrations below 0.2 per cent by weight of benzoyl peroxide have relatively little effect. With concentrations above 0.5 per cent, however, extensive cross-linking and gelation are produced at temperatures above 100° C. The cross-linking of fully saturated polyesters by the method of the present invention is illustrated by the following example:

*Example 10*

2 grams of polyethylene succinate having an intrinsic viscosity of 0.52 (as measured with a chloroform solution containing 0.4 gram of polyester per 100 cc. of solution) were dissolved in hot methyl Cellosolve acetate and 0.2 grams of benzoyl peroxide were added to the solution. Clear films of the solution were formed on metal and heated in an oven at 140° C. The liquid films gelled in 10 minutes. The concentration of benzoyl peroxide necessary to cause gelation is dependent upon the intrinsic viscosity of the polymer employed. In general, the intrinsic viscosity should exceed 0.30.

The cross-linked polymers of the present invention are adapted to many uses. Microcrystalline polyesters, not yet cross-linked, may be mixed with an organic peroxide and used for compression molding in the same manner as other thermosetting resinous substances. The mixture of microcrystalline polyester and organic peroxide may also be subjected to an injection molding procedure and the resulting body may subsequently be heated to a curing temperature. If the polyesters of the present invention have been cross-linked to an extent insufficient to produce gelation, they may be converted into a plastic melt which may readily be molded into any desired shape. Such plastic cross-linked polyesters also possess a relatively broad supercooling interval so that they will not crystallize immediately upon being cooled below their crystalline "melting point." In the supercooled state they may therefore be subjected to a molding or stamping procedure which simultaneously forms the mass into the desired shape and induces crystallization. Molding in this manner is more particularly described and claimed in the copending application of C. S. Fuller, Serial No. 401,955, filed July 11, 1941.

The property of the gelled polymers of the present invention of passing from a hard, tough crystalline material into a rubbery substance at the crystalline melting point makes them admirably adapted for another type of molding procedure. At temperatures above the crystalline melting point the polymers of the present invention may be subjected to a considerable degree of physical distortion without the formation of cracks in the material. Thus a body of cross-linked polymer may be heated above its transparency point or crystalline "melting point," formed into shape in a mold and cooled while being held in this shape. When the body is again heated to its crystalline "melting point" it will return to its original shape due to its rubber-like properties and the release of crystal forces.

Polyesters which upon cross-linking will possess the property of cold drawing may be formed into excellent fibres by drawing them into fibre form while they are mixed with benzoyl peroxide and before they have been converted to an infusible state. They may subsequently be completely cured and cold drawn to produce flexible fibres of high tensile strength. The products of the present invention will be found useful for most of the purposes for which the linear superpolymers and other materials of resinous properties are adapted.

As discussed above the polymers of the present invention are adapted to be impregnated into porous or fibrous materials such as textile fabrics, paper, wood pulp and the like. This impregnation is accomplished by impregnating the polyester in the uncured state into the porous material and subsequently converting the polymer to an infusible state by heating in the presence of an organic peroxide. It is desirable, though not necessary, that the initial polyester prior to curing have a melt viscosity not above about 500 poises at 120° C. so as to permit ready impregnation. A melt viscosity between about 150 poises and about 400 poises at 120° C. is the most desirable.

The molten polymer may be impregnated into the porous article by any suitable method. Because of the low viscosity of the uncured polyester, impregnation takes place fairly readily. The compound used for curing may be incorporated into the impregnated body in any suitable manner. Thus the compound may be thoroughly mixed with the molten polyester immediately prior to impregnation. Alternatively the porous body, as for instance a textile thread or fabric, may prior to impregnation with the polyester be thoroughly impregnated with a solution of the compound and the solvent may be evaporated. Heating of the impregnated body containing the curing compound at temperatures above 100° C., preferably about 150° C., for about 5 minutes will produce the necessary curing.

Figure 3:
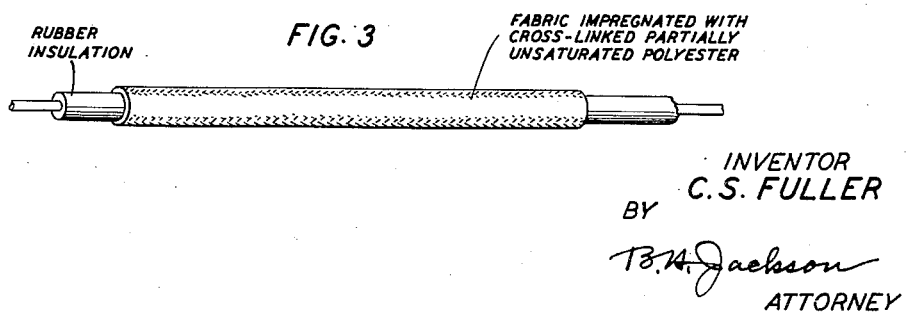
Fig. 3 represents a piece of insulated wire having a protective covering formed by the method of the present invention.

The products of the present invention are particularly adapted for the impregnation of textile, pulp, paper or other fibrous coverings on electrical conductors. A conductor of this type is illustrated in Fig. 3 which shows a conductor made of a metal wire insulated with a rubber composition and having over the rubber insulation a protective covering of a textile fabric, such as a cotton braid, impregnated with a cross-linked polyester prepared as described above. This type of conductor is particularly suited for the outdoor transmission of electric currents for communication purposes. The toughness of the polymer, the resistance of the polymer to hydrolysis and the more thorough impregnation possible with this type of polymer impart to the impregnated covering an extremely high resistance to the abrasion to which this type of wire is normally subject.

It has been difficult to find a substance which would be suitable as an impregnant for this type of wire. Up to the present time the common commercial practice has involved the use of asphalts and asphalt-stearin pitch mixtures as saturants and finishing compounds. These materials have been used because of their relative cheapness and their ability to be melted into comparatively fluid liquids for impregnation at relatively low temperatures.

It has been suggested that the linear polyesters of sufficiently high molecular weight to possess the property of cold drawing be employed as impregnants for this type of wire. Wire coverings impregnated with these materials have been found to have very desirable properties. The wires having textile coverings impregnated with the polymers of the present invention possess a considerably greater abrasion-resistance than the coverings impregnated with the linear polyesters.

Moreover, the cross-linked polymers of the present invention have a much greater resistance to hydrolysis than do the linear polyesters and therefore they are much less subject to deterioration upon continued exposure to the weather. This superior resistance to hydrolysis is indicated by the following tests in which polymer samples were maintained in distilled water at 80° C. for a time sufficient to cause equivalent loss of flexibility and tensile strength when cooled to room temperature.

| Polymer sample | Time to failure |
| --- | --- |
| | Hours |
| Polyethylene succinate (intrinsic viscosity 0.65) | 16 |
| Polyethylene sebacate (intrinsic viscosity 0.95) | 24 |
| Polyethylene succinate maleate (5 per cent maleic acid by weight of total acid; melt viscosity of 165 poises at 120° C. prior to cross-linking; cross-linked with 0.5 per cent benzoyl peroxide) | 72 |
| Polyethylene sebacate maleate (5 per cent maleic acid by weight of total acid; melt viscosity of 100 poises at 120° C. prior to cross-linking; cross-linked with 0.5 per cent benzoyl peroxide) | 100 |

It is not necessary that the partially unsaturated polyesters used for impregnating the textile coverings on wire for outdoor use have a curing compound added to them or that they be purposely cross-linked before the wire is used. When wire of this type is impregnated with unconverted partially unsaturated polyesters and is exposed to air and sunlight, cross-linking is induced in the polymer, thus imparting the desirable properties of cross-linking.

The toughness, abrasion resistance, resistance to hydrolysis and good electrical properties of the cross-linked polymers of the present invention also render them very desirable for other insulating purposes, as for the impregnation of textile fabrics, paper, pulp or other fibrous coverings on bare wire, for the formation of coatings directly over bare wire, for the formation of coatings over rubber or other insulations on wire, and for the coating of textile fabrics, paper, pulp or other fibrous material on wire without substantial impregnation.

The following specific examples will illustrate the use of the polymers of the present invention for impregnating porous bodies and for forming insulation on wire.

*Example 11*

A polymer was prepared according to the procedure of Example 1 but without the incorporation of benzoyl peroxide or subsequent cross-linking. One thousand grams of this product was pigmented by stirring in 50 grams of carbon black while the polymer was in the molten state. The molten substance was then extruded over a rubber covered wire and a braided textile covering was then formed over the wire while the material was still fluid, using a textile which had previously been impregnated with a 2 per cent solution of benzoyl peroxide in benzene. Immediately after the braiding operation, the wire was passed through a finishing die and then through a curing oven maintained at 150° C. The wire was then dusted with finely divided mica and allowed to cool. A tough, hard, abrasion-resistant covering was obtained which had good weathering properties.

*Example 12*

A wire was prepared in the same manner as described in Example 11 using a polymer which was similar except that 2880.0 grams of sebacic acid were substituted for the 1681.5 grams of succinic acid used in its preparation. The resulting covering was similar in its properties except that it remained more flexible at low temperatures.

*Example 13*

The unconverted polymer of Example 9 was pigmented with carbon black and extruded over a rubber covered wire as described in Example 11. A braided cotton covering was then formed over the wire while the polymer was still fluid, using a textile containing no benzoyl peroxide. No curing operation was employed. A tough, hard, abrasion-resistant covering was obtained which had good weathering properties.

*Example 14*

A polymer was prepared as described in Example 2 without the incorporation of benzoyl peroxide and subsequent cross-linking. One thousand grams of this material was heated to 60° C. and 10 grams of benzoyl peroxide together with 50 grams of carbon black were thoroughly incorporated by mixing. This material, heated to 60° C., was employed in a special impregnating device to impregnate the textile braid over a parallel pair of rubber covered drop wire. The wire was then pulled through a finishing die and a curing oven maintained at 150° C., subsequently dusted with finely divided mica and allowed to cool.

Example 15

A composition containing carbon black and benzoyl peroxide was prepared as described in Example 14 and was used to coat a bare copper conductor by pulling the conductor through a coating device which formed a uniform coating of the polymer composition. The coated conductor was then immediately passed through an oven maintained at a temperature above 150° C. in order to cure the polymer. A tough, flexible coating having excellent electrical properties was obtained.

Example 16

100 grams of polyethylene succinate maleate (the maleic acid constituting 7 per cent by weight of the total acid used in the preparation of the polymer) having a melt viscosity of 200 poises at 120° C. was intimately mixed while hot with 20 grams of styrene and 3 grams of lamp black. This material was applied in the molten state to a rubber insulated conductor; cotton yarn bearing on its surface a deposit of benzoyl peroxide in amounts sufficient to catalyze strongly the polymerization reaction was then braided directly into the fluid material over the rubber. The braided conductor was then passed through a smoothing orifice and cured at a temperature of 130° C. for 10 minutes. A tough abrasion-resistant and water-resistant covering was obtained.

Example 17

A cotton fabric was impregnated with molten polyethylene succinate fumarate (prepared with 3 per cent fumaric acid by weight of the total acid) having a melt viscosity of 1,000 poises at 120° C. and the excess material was scraped off with a steel blade. Sheets of this material were uniformly dusted with finely divided benzoyl peroxide in an amount equal to about 0.5 per cent by weight of the polymer. The impregnated sheets were then stacked in a hydraulic press and pressed together at 120° C. under a pressure of 500 pounds per square inch for 15 minutes. Tough, abrasion-resistant sheets, suitable for use as artificial leather, were produced in this manner.

The invention has been described in terms of its specific embodiments but it is apparent that certain modifications will be suggested to those skilled in the art. Such modifications are intended to be included within the scope of the present invention which is to be limited only by the scope of the appended claims.

What is claimed is:

1. An infusible insoluble polymer produced by curing, with an organic peroxide, a fusible microcrystalline dihydroxy aliphatic hydrocarbon-dicarboxy aliphatic hydrocarbon polyester, said polyester possessing sufficient crystallinity and a sufficient degree of linear growth to impart the property of cold drawing when in the form of thin filaments.

2. An infusible insoluble polymer produced by curing, with an organic peroxide, a fusible microcrystalline polyester the molecules of which, aside from the functional end groups, consist of aliphatic hydrocarbon radicals linked together with ester groups of the structure

into linear ester chains, the degree of crystallinity and the degree of linear growth of the polyester being sufficient to impart the property of cold drawing when in the form of fine filaments, said polyester containing less than 5 olefinic bonds per 400 atoms in the linear ester chains, calculated by assuming no cross-linking between molecules at the unsaturated bonds, said polyester containing no other carbon-to-carbon unsaturated bonds.

3. An infusible, insoluble polymer produced by curing with benzoyl peroxide, a fusible microcrystalline dihydroxyalkane-dicarboxyalkane-dicarboxyolefin polyester, the dihydroxyalkane being composed of two hydroxyl groups substituted on the opposite end carbon atoms of a straight chain alkane, the dicarboxyalkane being composed of two carboxyl groups substituted on the opposite end carbon atoms of a straight chain alkane, the dicarboxyolefin and the dicarboxyalkane being so proportioned that the polyester contains less than 5 olefinic bonds per 400 atoms in the linear ester chains, calculated by assuming no cross-linking between molecules at the unsaturated bonds, said fusible polyester possessing sufficient crystallinity and a sufficient degree of linear growth to impart the property of cold drawing when in the form of thin filaments.

4. An infusible, insoluble polymer produced by curing, with benzoyl peroxide, a fusible microcrystalline dihydroxyalkane - dicarboxyalkane-maleic acid polyester, the dihydroxyalkane being composed of two hydroxyl groups substituted on the opposite end carbon atoms of a straight chain alkane, the dicarboxyalkane being composed of two carboxyl groups situated on the opposite end carbon atoms of a straight chain alkane, the maleic acid and dicarboxyalkane being so proportioned that the polyester contains less than 5 olefinic bonds per 400 atoms in the linear ester chains, calculated by assuming no cross-linking between molecules at the unsaturated bonds, said fusible polyester possessing sufficient crystallinity and a sufficient degree of linear growth to impart the property of cold drawing when in the form of thin filaments.

5. An infusible, insoluble polymer produced by curing, with benzoyl peroxide, a fusible microcrystalline ethylene glycol-succinic acid-maleic acid polyester, the maleic acid and succinic acid being so proportioned that the polyester contains less than 5 olefinic bonds per 400 atoms in the linear ester chains, calculated by assuming no cross-linking between molecules at the unsaturated bonds, said fusible polyester possessing sufficient crystallinity and a sufficient degree of linear growth to impart the property of cold drawing when in the form of thin filaments.

6. An infusible, insoluble polymer produced by curing, with benzoyl peroxide, a fusible microcrystalline ethylene glycol-sebacic acid-maleic acid polyester, the maleic acid and sebacic acid being so proportioned that the polyester contains less than 5 olefinic bonds per 400 atoms in the linear ester chains, calculated by assuming no cross-linking between molecules at the unsaturated bonds, said fusible polyester possessing sufficient crystallinity and a sufficient degree of linear growth to impart the property of cold drawing when in the form of thin filaments.

7. An infusible, insoluble polymer produced by curing, with benzoyl peroxide, a fusible microcrystalline dihydroxyalkane - dicarboxyalkane polyester having an intrinsic viscosity in chloroform greater than .3, the dihydroxyalkane being composed of two hydroxyl groups substituted on the opposite end carbon atoms of a straight chain alkane, the dicarboxyalkane being composed of two carboxyl groups situated on the opposite end carbon atoms of a straight chain alkane, said fusible polyester possessing sufficient crystallinity and a sufficient degree of linear growth to impart the property of cold drawing when in the form of thin filaments.

8. An infusible, insoluble polymer identical with the polyester produced by curing, with benzoyl peroxide, polyethylene succinate having an intrinsic viscosity in chloroform greater than .3 and having a sufficient degree of linear growth to impart the property of cold drawing when in the form of thin filaments.

9. An electrical conductor covered with a layer comprising a fibrous material impregnated with an infusible insoluble polymer produced by curing, with an organic peroxide, a fusible microcrystalline dihydroxy aliphatic hydrocarbon-dicarboxy aliphatic hydrocarbon polyester, said fusible polyester possessing sufficient crystallinity and a sufficient degree of linear growth to impart the property of cold drawing when in the form of thin filaments.

10. An electrical conductor covered with a layer comprising textile fabric impregnated with a polymer produced by curing, with benzoyl peroxide, a fusible ethylene glycol-sebacic acid-maleic acid polyester, which fusible polyester possesses the property of cold drawing.

11. An electrical conductor covered with a layer comprising a textile fabric impregnated with an ethylene glycol-sebacic acid-maleic acid polyester, which polyester possesses the property of cold drawing.

12. A shaped body of a normally microcrystalline, normally rigid polymer which, above its crystalline melting point, is a deformable, infusible, rubber-like gel possessing reversible elasticity, said polymer being produced by curing, with an organic peroxide, a fusible, microcrystalline polyester, the molecules of which, aside from the functional end groups, consist of aliphatic hydrocarbon radicals linked together with ester groups of the structure $$-\underset{\underset{O}{\|}}{C}-O-$$

into linear ester chains, the degree of crystallinity and the degree of linear growth of the polyester being sufficient to impart the property of cold drawing when in the form of fine filaments, said polyester containing less than 5 olefinic bonds per 400 atoms in the linear ester chains, calculated by assuming no cross-linking between molecules at the unsaturated bonds, said polyester containing no other carbon-to-carbon unsaturated bonds, said body being crystallized in a shape different from that to which the body would return under the influence of its elasticity when heated above its crystalline melting point.

13. The shaped body described in claim 12 wherein the polymer is produced by curing, with an organic peroxide, a fusible, microcrystalline dihydroxy aliphatic hydrocarbondicarboxy aliphatic hydrocarbon polyester, said polyester possessing sufficient crystallinity and a sufficient degree of linear growth to impart the property of cold drawing when in the form of thin filaments.

14. The shaped body described in claim 12 wherein the polymer is produced by curing, with benzoyl peroxide, a fusible, microcrystalline ethylene glycol-sebacic acid-maleic acid polyester, the maleic acid and sebacic acid being so proportioned that the polyester contains less than 5 olefinic bonds per 400 atoms in the linear ester chains, calculated by assuming no cross-linking between molecules at the unsaturated bonds, said fusible polyester possessing sufficient crystallinity and a sufficient degree of linear growth to impart the property of cold drawing when in the form of thin filaments.

CALVIN S. FULLER.